United States Patent [19] … [11] 3,915,318
Cook et al. … [45] Oct. 28, 1975

[54] BALE SEPARATING HOOKS FOR A SINGLE BALE UNLOADING BALE WAGON

[75] Inventors: Albert C. Cook, Kingsburg, Calif.; Raymond E. Fisher, Lancaster, Pa.

[73] Assignee: Sperry Rand Corporation, New Holland, Pa.

[22] Filed: Feb. 4, 1974

[21] Appl. No.: 439,210

Related U.S. Application Data

[63] Continuation of Ser. No. 240,492, April 3, 1972, abandoned.

[52] U.S. Cl. ............ 214/8.5 K; 214/6 B; 294/82 R; 24/230.5 R
[51] Int. Cl.² ........................................ B65G 59/08
[58] Field of Search ............ 214/501 R, 6 B, 8.5 K, 214/518–520; 294/82 R, 78 R, 26 R; 24/230.5 R

[56] References Cited
UNITED STATES PATENTS

| | | | |
|---|---|---|---|
| 595,181 | 12/1897 | Langan | 294/78 R |
| 680,822 | 8/1901 | Uren | 294/82 R |
| 1,548,209 | 8/1925 | Rounds | 294/82 R |
| 1,793,615 | 2/1931 | Hooker | 294/82 R |
| 3,502,230 | 3/1970 | Grey et al. | 214/6 B |

*Primary Examiner*—Robert J. Spar
*Assistant Examiner*—Kenneth Noland
*Attorney, Agent, or Firm*—John R. Flanagan; Frank A. Seemar; Joseph A. Brown

[57] ABSTRACT

A plurality of bale separating hooks for employment in cooperation with an unloading table of a single bale unloading bale wagon in separating one or more layers of a tier from a single layer, such that the single separated layer may be conveyed from the bale wagon without interference from the other layers of the tier. Each bale hook of the present invention comprises a base portion; a main body portion integrally formed with said base portion and including a front face and a shedding back surface that is normally disposed adjacent the single separated layer during tier separation; and a head portion integrally formed with said main body portion and extending angularly therefrom, said head portion being provided with an arcuate shaped tip.

4 Claims, 6 Drawing Figures

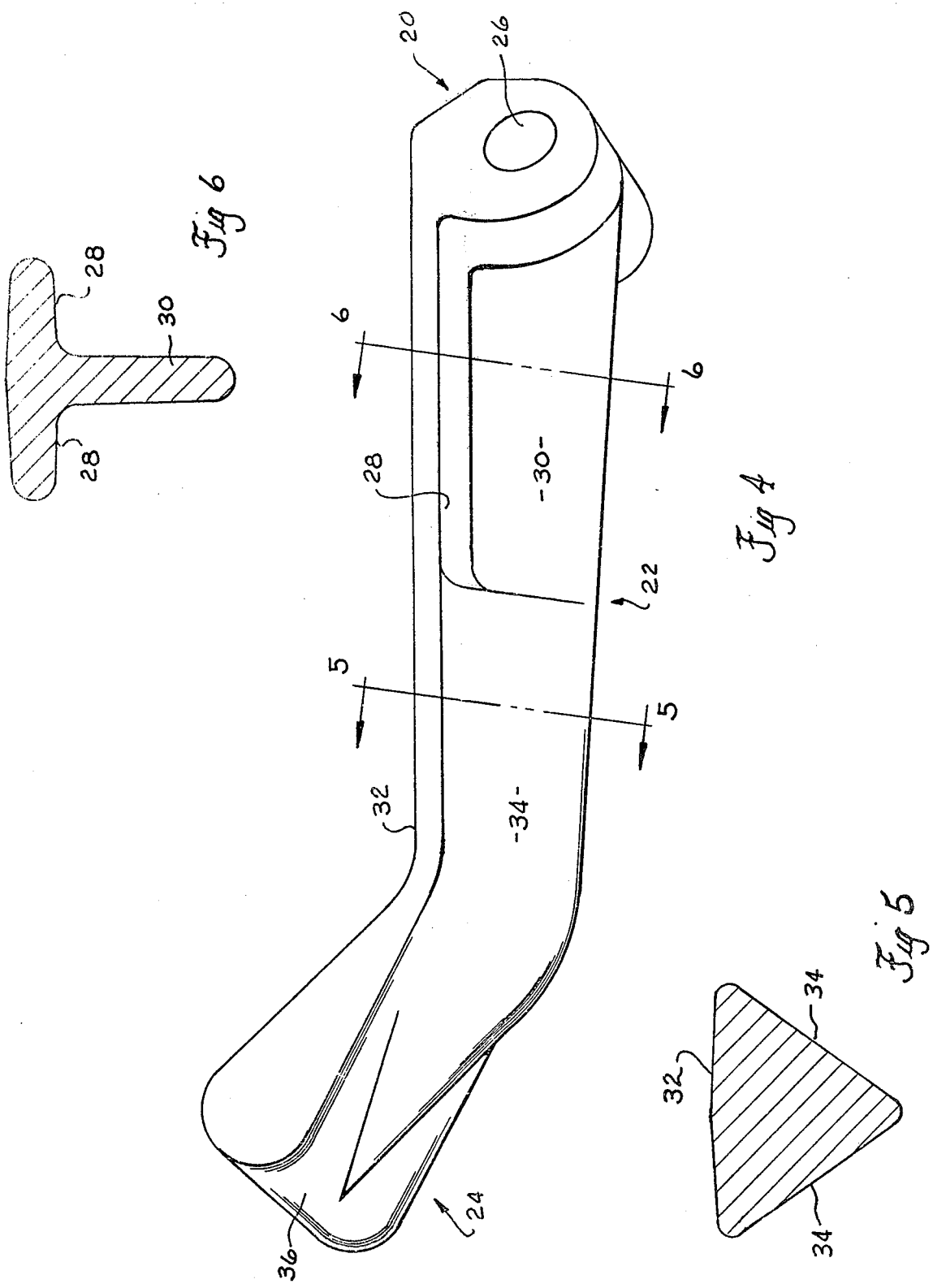

BALE SEPARATING HOOKS FOR A SINGLE BALE UNLOADING BALE WAGON

This is a continuation of application Ser. No. 240,492, filed Apr. 3, 1972, now abandoned.

BACKGROUND OF THE INVENTION

The present invention relates to bale wagons of the single bale unloading type, and more particularly to the means employed therein to separate one or more layers of a tier from a single layer.

In the past, single bale unloading bale wagons of the type shown and described in U.S. Pat. No. 3,502,230 to D. M. Grey have utilized a plurality of bale separating hooks that cooperate with an inclined unloading table to separate one or more layers of a tier from a single layer such that the single layer may be conveyed from the unloading table without interference from the other layers of the tier. From a study of this patent, it will be observed that the bale separating hooks are operative to move from a position generally below the unloading table, through openings formed therein, to a position generally above the unloading table. During the process of moving from the down position to the up position, the bale separating hooks engage a portion of the tier disposed on the unloading table and move that portion generally up the inclined unloading table, thereby separating that portion from a single layer disposed on a lower portion of the same unloading table. It will be further observed from studying the Grey Patent, U.S. Pat. No. 3,502,230, that the bale separating hooks disclosed therein are comprised of a relatively thin and flat structural member with a transverse cross piece secured intermediate the ends thereof. This type of bale separating hook, although generally successful, does have some disadvantages. Principal among the disadvantages is that when in the up position the backs of the bale separating hooks lie closely adjacent one side of the single separated layer to be conveyed from the unloading table. Once the single separated layer begins moving transversely from the unloading table the back sides of the bale separating hooks sometimes tends to engage and tear into the sides of the bales being conveyed from the unloading table, thereby shredding and damaging the individual bales of hay.

Also, the bale separating hooks of the prior art each included a pointed tip that protruded into the bales as the bale separating hooks were raised from the lower position to the up position. The penetration of the bale separating hooks into the lowermost layer of the tier portion being separated normally resulted in the lowermost layer being lifted from the unloading table and held in a lifted position while the bale separating hooks were up. Once the bale separating hooks were lowered to their down position, the lowermost layer formally engaged with the bale separating hooks would tend to roll down the inclined unloading table instead of sliding. Moreover, it was not uncommon for the twine binding the individual bales to be cut by the bale separating hooks, particularly as the hooks were disengaged from the bales to return to their down position.

SUMMARY OF THE INVENTION

Applicants have devised a bale separating hook which comprises a base portion, a main body portion and a head portion, all three of the foregoing portions being integrally formed into one unitary bale separating hook. In particular, the body portion includes a generally flat face adapted to be directed towards the one or more layers to be pushed up the inclined loading table during single bale unloading, and a shedding back surface that when the bale separating hooks are in the up position lies adjacent the single layer to be conveyed from the unloading table and is particularly adapted to shed the layer as it is transversely conveyed from the bale wagon without tearing into the sides of the individual bales of the layer.

Moreover, the head portion of the bale separating hook is provided with an arcuate shaped tip that will slide against the bales being separated from the single layer, and will not penetrate and lift the lowermost layer of the tier portion being moved as was sometimes common in the prior art.

It is therefore the principal object of the present invention to develop a bale separating hook for employment with the unloading table of a single bale unloading wagon that will overcome the disadvantages of the prior art.

A further object of the present invention is to provide a bale separating hook that will shed the single layer of bales being conveyed from the unloading table without tearing and shredding the bales in the process.

Another object of the present invention resides in the provision of a bale separating hook having an arcuate shaped tip that when directed towards a portion of the tier to be moved up the inclined unloading table does not substantially penetrate the adjacent bales of the tier portion being moved.

It is a further object of the present invention to provide a bale separating hook that includes a smooth head surface that is capable of moving against the twine encircling the bales of hay without snagging and cutting the twine.

Other objects and advantages of the present invention will become apparent and obvious from a study of the following description and the accompanying drawings which are merely illustrative of the present invention.

BRIEF DESCRIPTION OF THE DRAWINGS

FIG. 4 is an enlarged perspective view of the same bale separating hook shown in FIG. 3.

FIG. 5 is a sectional view taken through the line 5—5 of FIG. 4.

FIG. 6 is another sectional view taken along the line 6—6 of FIG. 4.

DESCRIPTION OF THE PREFERRED EMBODIMENT

Figure 1:
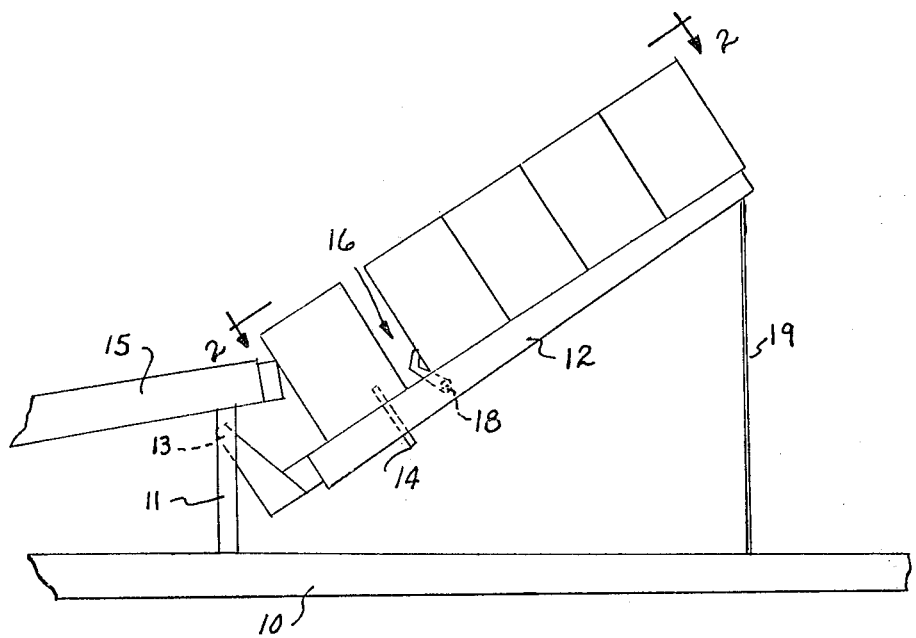
FIG. 1 is a fragmentary side elevational view of a single bale unloading bale wagon, particularly showing bale separating hooks of the present invention in their up position and engaged with a tier portion so as to maintain that tier portion in a separated relationship relative to a single layer disposed about the lower portion of the same unloading table.

With reference to the drawings, particularly FIG. 1, a fragmentary side elevational view of a single bale unloading bale wagon is shown therein and comprises a chassis structure 10 and a single bale unloading table 12 pivotally mounted about axis 13 to a support structure 11 extending upright from the chassis 10. During single bale unloading, the unloading table 12 is inclined relative to the chassis 10 and is held in this inclined position by a prop 19, or other suitable means. Also, in FIG. 1 a portion of a load bed 15 is shown, the load bed being generally spaced rearwardly of the unloading table 12.

The unloading table 12 includes a transversely disposed cross conveyor 14 which is particularly adapted to convey a single separated layer of a tier from the unloading table once the adjacent bales of the tier have been separated therefrom. The adjacent bales of the tier are separated from the single layer by a plurality of bale separating hooks, indicated generally by the numeral 16. Each bale separating hook 16 is secured to a transverse rockshaft 18 and adapted to move from a down position, not shown, to an up position, as shown in FIG. 1, where the bale separating hooks function to separate one or more layers of the tier from a single layer. Since the present invention basically concerns the bale separating hooks, the present disclosure will not dwell on the control means for controlling the bale separating hooks 16 and the cross conveyor 14 of the unloading table 12. For a complete understanding of the control means for the bale separating hooks and cross conveyor of a single bale unloading bale wagon, one is directed to the previously referred to patent to D. M. Grey et al., U.S. Pat. No. 3,502,230, and a concurrently filed U.S. patent application entitled "Single Bale Unloading Control System" invented by Raymond E. Fisher et al., this concurrently filed U.S. patent application being hereby incorporated in the present application by reference.

Turning to FIGS. 3–6, the bale separating hook of the present invention is shown in detail. In the preferred embodiment, the bale separating hook is preferably a casting, but as will be evident to those skilled in the art after a study of the present disclosure the principal attributes of the present invention may very well be incorporated into a fabrication.

Viewing the structure of the bale separating hook 16 it will be seen particularly from FIG. 4 that the present bale separating hook comprises a base portion 20, a main body portion 22 and a head portion 24, all three portions being indicated generally. The base portion 20 of the bale separating hook includes a transverse bore 26 formed therein to receive the rockshaft 18 which supports and actuates all of the bale separating hooks employed on the unloading table 12.

Main body portion 22 is integrally formed with the base portion 20 and extends generally therefrom with the lower part of the main body 22, as viewed in FIG. 4, being referred to as the lower body portion. The lower body portion is generally T-shaped, as seen in FIG. 6, and comprises a pair of flanges 28 disposed perpendicular to a web 30 that extends along the back of the flanges. This particular T-shaped lower body portion gives the bale separating hook the necessary strength it needs without contributing excess weight.

Figure 2:
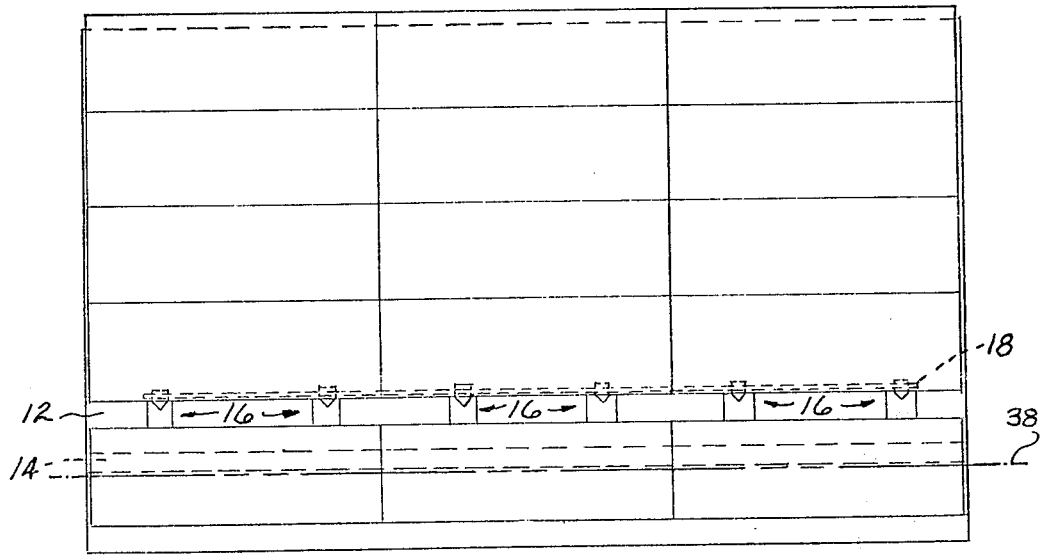
FIG. 2 is a view taken along the line 2—2 of FIG. 1.
Figure 3:
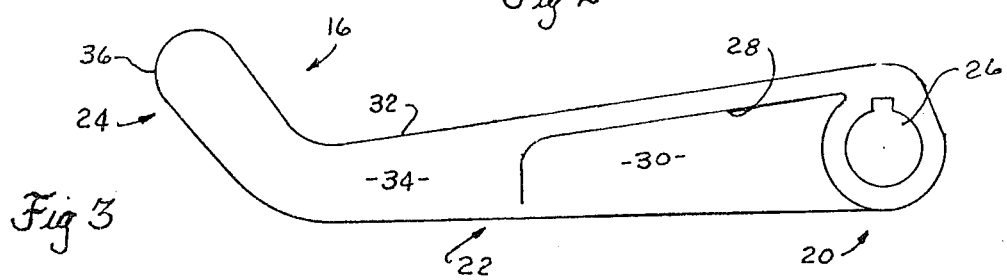
FIG. 3 is a side elevational view of the bale separating hook of the present invention.

Integrally formed between the lower body portion of the main body 22 and the head 24 is a generally triangular shaped upper body portion. The upper body portion includes a front face 32 that is generally co-planar with the front of the flanges 28 of the lower body portion, thereby defining a generally flat face from the base 20 to the head 24. The back of the upper body portion is what is generally referred to as the shedding surface of the bale separating hooks, the shedding surface comprising generally V-shaped sides 34 as best seen in section in FIG. 5. These generally V-shaped sides 34 are disposed in oblique planes to the transverse center line of the layer of bales being conveyed from the unloading table, the transverse center line being particularly shown in FIG. 2 and denoted therein by the numeral 38. Therefore, when the sides of the bales of the single layer being conveyed from the unloading table come into contact with the back shedding sides 34 of the bale separating hooks, the generally V-shaped sides tend to shed the bales and guide the bales thereby without tearing into the bales and shredding them. It will be observed from studying the previously mentioned concurrently filed patent application entitled "Single Bale Unloading Control System" that this application discloses means for controlling the cross conveyor such that the bales may be conveyed to either side of the single bale unloading table. In view of this, it should be appreciated that each of the bale separating hooks of the present invention is designed to shed the bales of hay irrespective of the direction in which the layer is being conveyed due to the general V-shaped back.

Extending angularly from the upper body portion of the main body 22 and integrally formed therewith is a head portion 24. The head portion 24 includes an arcuate shaped tip 36 about the upper portion thereof, as viewed in FIG. 4.

Therefore, it is seen that the shedding surface 34 is particularly provided to shed the single layer of bales being conveyed from the unloading table, thereby preventing the tearing and shredding of bales that was possible by the bale separating hooks of the prior art. Also, one other important aspect of the present invention relates to the head 24 which is provided with the arcuate or curved shaped tip 36 that tends to prohibit the bale hook from protruding into the bales of the tier portion being moved by the bale separating hooks. This, of course, prevents the bales from lifting and rolling as sometimes occurred with bale separating hooks of the prior art. Moreover, the relatively smooth surface surrounding the head 24 assures that the bale separating hooks will not snag and tear the twine surrounding the individual bales of the tier. Therefore, it is obvious that the bale separating hooks of the present invention provide a substantial and needed improvement over bale separating hooks of the prior art.

The terms, "upper," "lower," "forward," "rearward" etc. have been used herein merely for the convenience of the foregoing specification and in the appended claims to describe the bale separating hooks for a single bale unloading bale wagon and its parts as oriented in the drawings. It is to be understood, however, that these terms are in no way limiting to the invention since the bale separating hooks for a single bale unloading bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In an unloading table of the type having a transversely disposed cross conveyor and adapted to be employed within a single bale unloading bale wagon, a plurality of rigid bale separating hooks cooperable with said unloading table for unloading individual bales of a tier having a plurality of layers disposed in side-by-side relationship by separating one or more layers of the tier from a single layer, whereby the single layer may be conveyed from said unloading table by the cross conveyor thereof, each bale separating hook comprising:
  a. a base portion;
  b. a generally elongated main body portion integrally formed with said base portion and extending therefrom and having a generally flat front face and a back formed about the rear of said face, each bale separating hook being oriented during tier separation such that the face thereof is directed toward the layer or layers being separated from the single layer while the back of each bale separating hook is disposed adjacent the single separated layer, said main body particularly comprising:
    1. a lower T-shaped body portion including a pair of flanges forming a part of the front face and a web disposed perpendicular to said flanges and extending rearwardly therefrom forming a portion of the back of the main body; and
    2. an upper body portion formed adjacent said lower T-shaped body portion and being generally triangular in cross section, the triangular cross section of the upper body portion giving rise to a front side coplanar with said flanges such that said front side and flanges generally constitute the face of said main body portion, and wherein said triangular cross section gives further rise to a two-sided V-shaped back portion opposite said front side with each side of the V-shaped back portion being directed rearwardly and inwardly relative to the front side, thereby providing the back of the main body portion with a shedding surface adjacent the single separated layer which tends to shed the bales of the single separated layer as the layer is being conveyed from the unloading table by the cross conveyor; and
  c. a head provided with an arcuate shaped tip and integrally formed with said upper body portion and extending angularly therefrom so as to define an obtuse angle relative to the face of said main body portion.

2. In a single bale unloading bale wagon of the type having an unloading table normally disposed at an incline, during single bale unloading, a transverse cross conveyor associated with said unloading table, a plurality of bale separating hooks operatively connected to said unloading table to separate one or more layers of a tier from a single layer such that the single layer may be conveyed from the unloading table by the cross conveyor, wherein the improvement comprises: a head portion for the bale separating hooks terminating in an upper tip portion in the form of a semi-cylindrical horizontally-extending body having a blunt bale-supporting surface which will not penetrate the bales of said layers so as to more easily and precisely lift and separate the lowermost layer of said tier from the single layer being conveyed from the unloading table.

3. In a single bale unloading bale wagon on the type having an unloading table normally disposed at an incline, during single bale unloading, a transverse cross conveyor associated with said unloading table, a plurality of bale separating hooks operatively connected to said unloading table to separate one or more layers of a tier from a single layer so that the single layer may be conveyed from the unloading table by the cross conveyor, wherein the improvement comprises: each of said bale separating hooks comprising a base portion adapted to be interconnected to a mounting member capable of actuating the hooks, a main body portion extending from said base portion and having a generally triangular cross section having a front face and generally V-shaped back sides, said back sides being disposed adjacent the single separated layer which is to be conveyed from the unloading table so that the back sides can act as shedding sides to aid in shedding the single separated layer from the remaining rows of bales in the tier, and a head portion integrally formed with and extending at an angle substantially less than 90° from said main body portion and terminating in an upper tip portion in the form of a semi-cylindrical horizontally-extending body which prevents said tip from penetrating said lowermost layer of bales so as to more easily and precisely lift and separate one or more layers of said tier from the single layer being conveyed from the unloading table.

4. In a single bale unloading bale wagon of the type having an unloading table normally disposed at an incline during single bale unloading, a transverse cross conveyor associated with said unloading table, a plurality of bale separating hooks operatively connected to said unloading table to separate one or more layers of a tier from a single layer so that the single layer may be conveyed from the unloading table by the cross conveyor, wherein the improvement comprises: bale separating hooks comprising a base portion containing a transverse bore formed therein to receive a mounting member capable of actuating the hooks, a main body portion which has a lower body portion, integrally formed with and extending from said base portion and terminating at approximately the center of the main body portion, said lower portion having a generally T-shaped cross section, and an upper body portion extending from the lower body portion, said upper portion having a generally triangular cross section having a front face which contacts and separates the lowermost layer of the tier so as to separate these layers from the single layer which is being conveyed from the unloading table by the cross conveyor and V-shaped back sides which act on the single layer to shed said layer from the tier, and a head portion integrally formed with and extending angularly from said main body portion and which has an arcuate shaped tip portion which acts on the separated layers to more easily and precisely lift and separate the layers from the single layer being conveyed from the unloading table.

* * * * *